United States Patent
Boyle et al.

(10) Patent No.: US 8,233,925 B1
(45) Date of Patent: *Jul. 31, 2012

(54) METHOD AND SYSTEM FOR MOBILE CLUB OPT-IN

(75) Inventors: Stephen S. Boyle, Lincoln, CA (US); Russell S. Greer, Los Gatos, CA (US)

(73) Assignee: Joingo LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/225,297

(22) Filed: Sep. 2, 2011

Related U.S. Application Data

(60) Provisional application No. 61/380,286, filed on Sep. 6, 2010.

(51) Int. Cl.
   *H04W 4/00* (2009.01)

(52) U.S. Cl. .................................. 455/466; 455/414.1

(58) Field of Classification Search .................. None
   See application file for complete search history.

(56) References Cited

U.S. PATENT DOCUMENTS

| | | | |
|---|---|---|---|
| 6,542,733 B1 * | 4/2003 | Dennis | 455/414.1 |
| 2008/0262929 A1 * | 10/2008 | Behr | 705/14 |
| 2009/0144201 A1 * | 6/2009 | Gierkink et al. | 705/64 |
| 2010/0135285 A1 * | 6/2010 | Gomez-Ortigoza | 370/352 |
| 2011/0212711 A1 * | 9/2011 | Scott | 455/414.2 |

\* cited by examiner

*Primary Examiner* — Erika Gary
(74) *Attorney, Agent, or Firm* — Clause Eight IPS; Michael Catania

(57) ABSTRACT

A method and system for qualifying and transmitting an invitation to a mobile phone number to receive digital communications is disclosed herein. A customer profile stored at a CRM database is analyzed and processed to determine if the data capable phone carrier and data capable communication device is associated with a phone number in the customer profile that has opted-in to receive digital communications such as for a mobile marketing campaign.

20 Claims, 6 Drawing Sheets

METHOD AND SYSTEM FOR MOBILE CLUB OPT-IN

CROSS REFERENCES TO RELATED APPLICATIONS

The Present Application claims priority to U.S. Provisional Patent Application No. 61/380,286, filed on Sep. 6, 2011, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to wireless communications. More specifically, the present invention relates to a method and system for mobile club opt-in.

2. Description of the Related Art

The use of mobile communication devices (phones, handsets and other wireless devices) is becoming a primary means for individuals to stay connected in their personal and professional lives. Mobile communication devices are also targeted by businesses to aid in their marketing efforts, delivering specific content directly to prospective customers. One means of marketing includes the use of "Rewards Club" programs, utilized by businesses in many different industries to offer their customers special incentives for their repeat business. One example of such a Rewards Club program is the American Airlines ADVANTAGE® airline mileage program, which rewards travelers for flying American Airlines. The Mobile Marketing Association ("MMA") has set forth guidelines for mobile advertising which requires that mobile communication device users opt-in to receive digital communications related to a mobile marketing campaign. Mobile Marketing as defined by the MMA is "a set of practices that enables organizations to communicate and engage with their audience in an interactive and relevant manner through any mobile device or network."

The prior art discusses various technologies related to companies communicating with personal mobile communication devices.

Vogel et al., U.S. Patent Publication Number 2010/0124937 for a Method Of Customer Relationship Management Using A Short Range Communications Network discloses a customer subscribing to a service from a business entity and receiving communications when the customer's BLUETOOTH device is detected within a certain range.

Harris et al, U.S. Pat. No. 7,920,850 for a Method And System For A Hospitality Entity To Communicate Goods And Services To A Guest discloses a customer opt-in in to a service from a business entity to receive discounts on goods and services from the business entity.

Puranik et al, U.S. Patent Publication Number 2004/171380 for Opt-In Pinging And Tracking For GPS Mobile Telephones discloses a method and system for a user to opt-in to being tracked through the GPS device of the user's mobile phone.

Berrey et al., U.S. Patent Publication Number 2007/0073808 for a Mobile Messaging System discloses delivering messages directly to a client from an enterprise regardless of the client's communication provider.

Pousti, U.S. Patent Publication Number 2008/0287095 for Systems And Methods For Generation, Registration And Mobile Phone Billing Of A Network-Enabled Application With One-Time Opt-In discloses one time opt-in for pre-authorization of charges to a mobile phone account for videos and songs.

Berezin et al., U.S. Patent Publication Number 2010/0121709 for an Invitation-Based Viral Advertising discloses opt-in form for viral distribution of advertising.

Liebowitz et al, U.S. Patent Publication Number 2006/0258399 for Interactive Opt-In Messaging discloses a method and system for a user to opt-in for receiving messages to the user's mobile phone wherein the user calls a number for a solicitation in the message.

Fotta et al., U.S. Patent Publication Number 2007/0136789 for a System And Method For Integrated Compliance And Contact Management discloses opt-in for one or more communication contact types based on a set of mediation rules.

Talisma Corporation, PCT Publication Number WO2010018472, for A Method To Drive A Campaign Workflow Based On A Short Message Service Message Response discloses generating and sending appropriate messages based on users responses to a marketing campaign.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

Internet is the worldwide, decentralized totality of server computers and data-transmission paths which can supply information to a connected and browser-equipped client computer, and can receive and forward information entered from the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Voice over Internet Protocol ("VoIP") relates to communications transmitted over the Internet such as SKYPE.

URL or Uniform Resource Locator is a address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

CRM is a widely-implemented strategy for managing a company's interactions with customers, clients and sales prospects. CRM involves using technology to organize, automate, and synchronize business processes and the like—principally sales activities, but also business processes and the like for marketing, customer service and technical support.

To the detriment of mobile marketers and others, the prior art has yet to provide a solution to use CRM data to determine if an individual has opted-in to receive digital communications and to determine if a phone number provided by the individual is associated with a data capable communication device and can receive digital communications.

BRIEF SUMMARY OF THE INVENTION

A preferred embodiment of the present invention provides a solution for a organization, such as a business, to determine if an individual has opted-in to receive digital communications and to determine if a phone number provided by the individual is associated with a data capable communication device and can receive digital communications from the organization.

One aspect of the present invention is a method for qualifying and transmitting an invitation to a mobile phone number to receive digital communications. The method includes analyzing a profile for a customer. The profile is preferably stored at a customer relations management ("CRM") database. The profile preferably includes a customer name, an opt-in decision of the customer, and at least one phone number for the customer. The method also includes determining that the customer has opted-in for digital communications. The method also includes determining a type, a phone carrier, and an age and location of registration of the at least one phone number. The method also includes screening the at least one phone number for association with a data capable phone carrier and communication device. The method also includes determining that the at least one phone number is associated with a data capable phone carrier and communication device. The method also includes transmitting from a digital content delivery engine to the data capable communication device associated with the at least one phone number a communication comprising a digital communication to be processed by the data capable communication device.

Another aspect of the present invention is a system for qualifying and transmitting an invitation to a mobile phone number to participate in a mobile marketing campaign. The system preferably includes a CRM database and a digital content delivery engine. The CRM database preferably includes a plurality of customer profiles. Each of the plurality of customer profiles preferably includes a customer name, an opt-in decision of the customer, and at least one phone number for the customer. The digital content delivery engine is preferably in communication with the CRM database. The digital content delivery engine is preferably configured to receive the plurality of customer profiles, analyze a customer profile of the plurality of customer profiles, determine if the customer profile has opted-in for digital communications, receive a mobile phone carrier and type and an age and location of registration for the at least one phone number of the customer, screening the at least one phone number for association with a data capable communication device, determine that the at least one phone number of the customer is associated with a data capable communication device, and transmit to the data capable communication device a communication comprising a digital communication.

Yet another aspect of the present invention is a system for qualifying and transmitting a message to a mobile phone number to receive digital communications. The system preferably includes a CRM database and a digital content delivery engine. The CRM database preferably includes a plurality of customer profiles. Each of the plurality of customer profiles preferably includes a customer name, an opt-in decision of the customer, and a plurality of phone numbers for the customer. The digital content delivery engine is preferably in communication with the CRM database. The digital content delivery engine is preferably configured to receive the plurality of customer profiles, analyze a customer profile of the plurality of customer profiles, determine if the customer profile has opted-in for digital communications, receive a mobile phone carrier and type and an age and location of registration for each of the plurality of phone numbers of the customer, screen each of the plurality of phone numbers for association with a data capable communication device, determine that at least one phone number of the customer is associated with a data capable communication device, and transmit to the data capable communication device associated with the most recent mobile phone number a communication comprising a digital communication.

Yet another aspect of the present invention is a method for qualifying and transmitting an invitation to a mobile phone number to participate in a mobile marketing campaign. The method includes analyzing a profile for a customer. The profile is preferably stored at a CRM database. The profile preferably includes a customer name, an opt-in decision of the customer, and a plurality of phone numbers for the customer. The method also includes determining that the customer has opted-in for digital communications. The method also includes receiving a phone carrier and type, and an age and location of registration of each of the plurality of phone numbers for the customer. The method also includes screening each of the plurality of phone numbers for the customer for association with a data capable communication device. The method also includes determining that at least one phone number of the plurality of phone numbers for the customer is associated with a data capable communication device. The method also includes transmitting from a digital content delivery engine to the data capable communication device associated with the at least one phone number a communication comprising a digital communication to be processed by the data capable communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
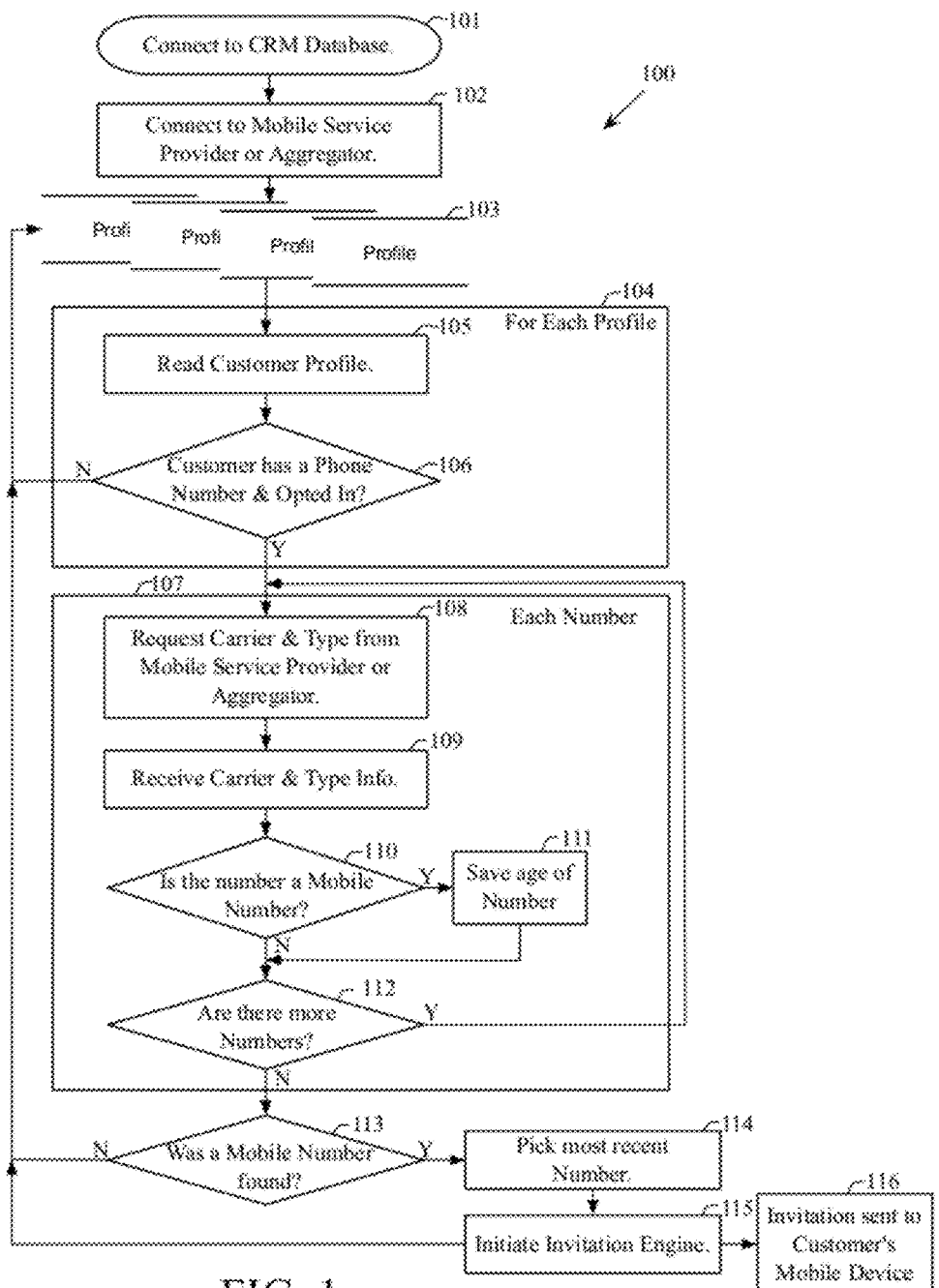
FIG. 1 is a flow chart of a mobile club opt-in process utilized to extract a ten digit phone number from a CRM database, qualify a phone number as a mobile phone number, and determine if a customer has opted-in to receive mobile communications to the phone number.

A flow chart of a mobile club opt-in process 100 utilized to extract a ten digit phone number from a CRM database, qualify a phone number as a mobile phone number, and determine if a customer has opted-in to receive mobile communications to the phone number is illustrated in FIG. 1. At block 101, a digital content delivery engine connects to a CRM database. At block 102, the digital content delivery engine connects to a mobile service provider or an aggregator. At block 103, the digital content delivery engine accesses multiple customer profiles in the CRM database. At block 104, for each of the customer profiles, the digital content delivery engine reads the customer profile at block 105 and at decision 106, the digital content delivery engine determines if the customer has opted-in to receive digital communications. In a most preferred embodiment, the digital communications are mobile marketing messages. However, those skilled in the pertinent art will recognize that a customer may opt-in for other digital communications without departing from the scope and spirit of the present invention. Also at decision 106, the digital content delivery engine determines if the customer has at least one phone number listed in the customer profile. If the customer has opted-in and has at least one phone listed in the customer profile, then at block 107, for each phone number, a request is sent at block 108 from the digital content delivery engine to a mobile service provider or an aggregator for information on the carrier and the type of mobile communication device associated with the phone number. At block 109, the digital content delivery engine receives the carrier and type of mobile communication device. At decision 110, the digital content delivery engine determines if the phone number is a mobile number. If the phone number is for a mobile number, then at block 111, the digital content delivery engine saves the age of the number. If the number is not a mobile number, then the digital content delivery engine inquires at decision 112 if there are more phone numbers in the customer profile. If there are no more numbers to analyze, then the digital content delivery engine inquires at decision 113 if a mobile number was found. If no, then the digital content delivery engine analyzes another customer profile. If a mobile number was found, then at block 114 the digital content delivery engine selects the most recent phone number based on the age of the phone number. At block 115, an invitation engine is initiated to produce an invitation for the customer. At block 116, an invitation is sent to the customer's mobile communication device, preferably as a SMS or MMS message.

Mobile communication devices utilized with the present invention ca include mobile phones, smartphones, tablets, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Each of the interface descriptions discloses use at least one communication protocol to establish handshaking or bi-directional communications. These protocols include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system include but are not limited to MSSQL, Access, MySQL, Progress, Oracle, DB2, Open Source DBs and others. Operating system used with the system include Microsoft 2010, XP, Vista, 200o Server, 2003 Server, 2008 Server, Windows Mobile, Linux, Android, Unix, I series, AS 400 and Apple OS.

The underlying protocol at a server for the digital content delivery engine is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. Essentially any protocol is used that is designed for transmission of media files. The protocol at the server is preferably HTTP.

The server transmits a delivery SMS message to the guest with information concerning an offer and the unique identifier code. Preferably, the SMS message is sent using standard SMS protocols used by wireless carriers. Alternatively, an application message is transmitted to the server using normal data protocols such as TCP/IP.

A digital content delivery engine preferably sends a request for phone number registry information to a phone carrier of the user such as VERIZON, AT&T, SPRINT, T-MOBILE, and the like phone carriers in order to determine what type of phone is used by the user. The carrier sends the phone number registry information (the type of phone) to the digital content delivery engine.

Figure 2:
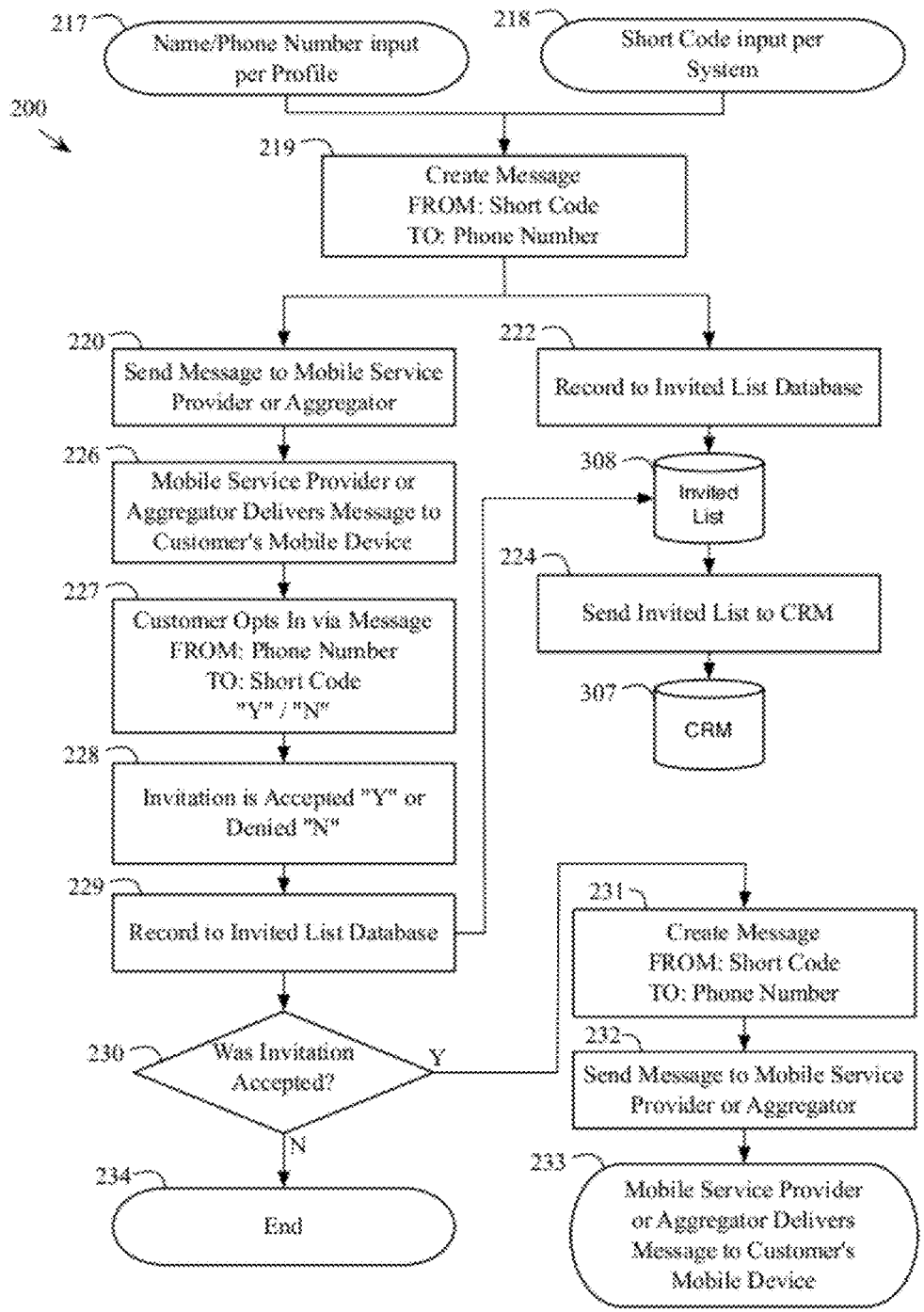
FIG. 2 is a flow chart of an invitation engine process for inviting a customer to opt-in to receive digital communications to a mobile communication device of the customer.

A flow chart of an invitation engine process 200 for inviting a customer to opt-in to receive digital communications to a mobile communication device of the customer is illustrated in FIG. 2. At block 217, a name and phone number(s) are inputted into a customer profile. At block 218, a short code is inputted into the system. At block 219, a message is created from the short code to the phone number. At block 220, a message is sent to a mobile service provider or aggregator. At block 222, the invitation message is recorded at an invited list database 223. At block 224, the invited list is sent to the CRM database 225. At block 226, the mobile service provider or aggregator sends the message to the customer's mobile communication device. At block 227, the customer opt-ins via message, preferably with a single character "Y" for Yes or a single character "N" for no. At block 228, the invitation is accepted or denied. At block 229, the invitation decision is recorded to the invited list database. At decision 230, an inquiry is made concerning the invitation. If the invitation was denied, then at block 334, the process ends. If the invitation was accepted, then at block 331, a message is created from the short code to the phone number. At block 332, the message is sent to the mobile service provider or aggregator. At block 333, the mobile service provider or aggregator delivers the message to the customer's mobile communication device.

Figure 3:
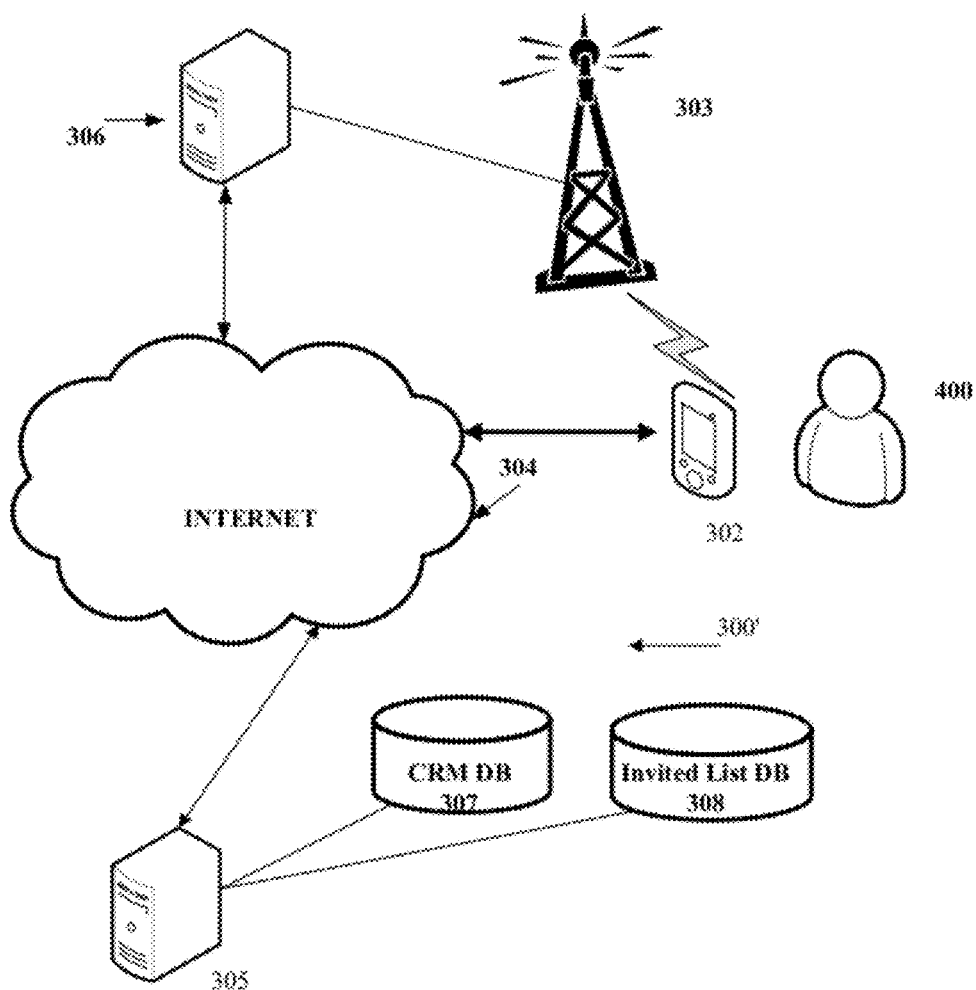
FIG. 3 is a block diagram of a system for determining if a customer has opted-in to receive digital communications to a mobile phone number.

A preferred system 300 for qualifying and transmitting an invitation to a mobile phone number to participate in a mobile marketing campaign is illustrated in FIG. 3. The user 400 has a mobile communication device 302. The mobile communication device 302 is connected to a mobile telephone network 303 and to the Internet 304. The digital content delivery engine resides at a server 305 which can communicate with a CRM database 307 and an invited list database 308. The digital content delivery engine also communicates with the mobile carriers or aggregators 306 over the Internet 304.

Figure 4:
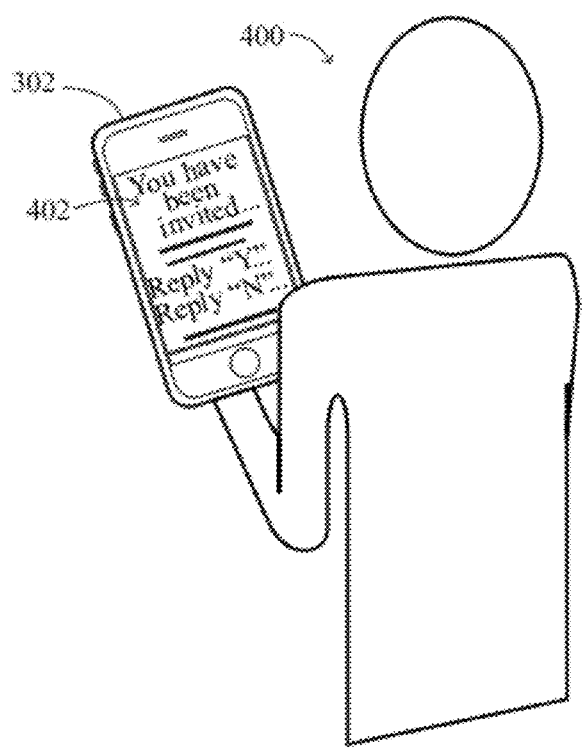
FIG. 4 is an illustration of a customer receiving a digital communication to a mobile communication device.

FIG. 4 illustrates a user 400 reviewing an opt-in invitation 402 on a mobile communication device 401.

Figure 5:
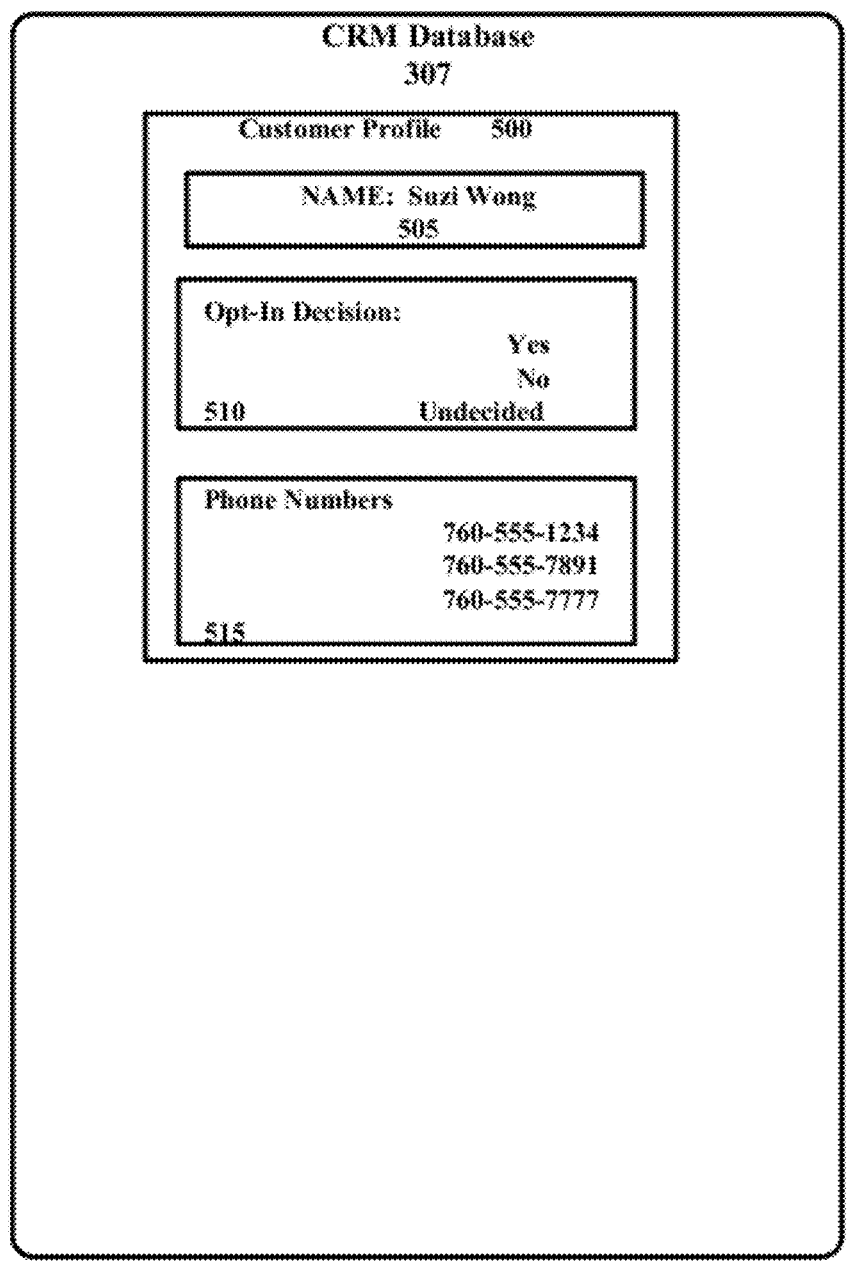
FIG. 5 is an illustration of a customer profile of the CRM database.

FIG. 5 illustrates a customer profile at the CRM database 307. The customer profile 500, includes a name 500, an opt-in decision 510 and multiple phone numbers 515.

Figure 6:
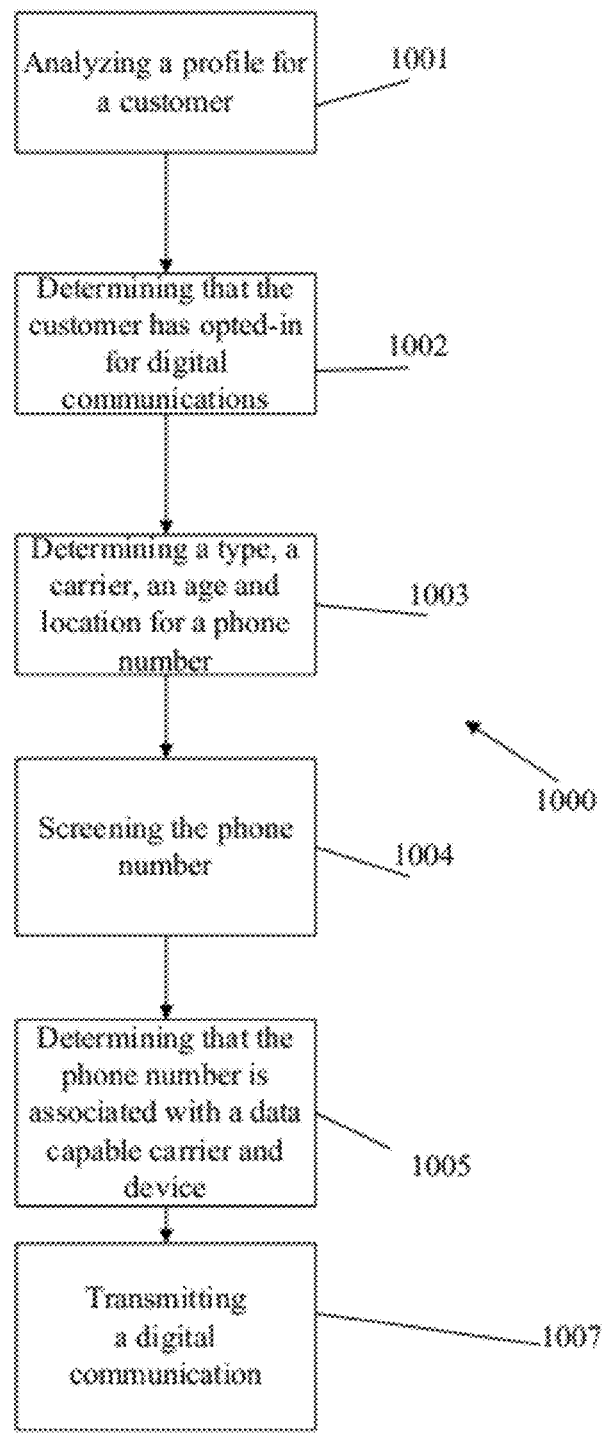
FIG. 6 is a flow of a specific method for qualifying and transmitting an invitation to a mobile phone number to receive digital communications.

A method 1000 for qualifying and transmitting an invitation to a mobile phone number to receive digital communications is illustrated in FIG. 6. At block 1001, a digital content delivery engine analyzes a profile for a customer. The profile is preferably stored at a customer relations management database. The profile preferably includes a customer name, an opt-in decision of the customer, and at least one phone number for the customer. At block 1002, the digital content delivery engine determines that the customer has opted-in for digital communications. At block 1003, the digital content delivery engine determines a type, a phone carrier, and an age and location of registration of the at least one phone number. At block 1004, the digital content delivery engine screens the at least one phone number for association with a data capable phone carrier and communication device. At block 1005, the digital content delivery engine determines that the at least one phone number is associated with a data capable phone carrier and communication device. At block 1007, the digital content delivery engine transmits to the data capable communication device associated with the at least one phone number a communication comprising a digital communication to be processed by the data capable communication device.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for qualifying and transmitting an invitation to a mobile phone number to receive digital communications, the method comprising:

analyzing existing profile for a customer, the existing profile stored at a CRM database and analyzed by a digital content delivery engine, the existing profile comprising a customer name, an opt-in decision of the customer, and at least one phone number for the customer;

determining that the customer has opted-in for digital communications;

determining a type, a phone carrier, and an age and location of registration of the at least one phone number;

screening the at least one phone number for association with a data capable phone carrier and a data capable communication device by sending a request for information from the digital content delivery engine to a data capable phone carrier and receiving the information from the data capable phone carrier at the digital content delivery engine;

determining at the digital content delivery engine that the at least one phone number is associated with a data capable phone carrier and the data capable communication device; and transmitting from the digital content delivery engine to the data capable communication device associated with the at least one phone number a communication comprising a digital communication to be processed by the data capable communication device.

2. The method according to claim 1 wherein the digital communication is a SMS communication.

3. The method according to claim 1 wherein the digital communication is a MMS communication.

4. The method according to claim 1 wherein the profile for the customer comprises a plurality of phone numbers and the method further comprises receiving a mobile phone carrier and type, and a date and location of registration for each of the plurality of phone numbers, and determining a phone number to transmit a digital communication to based on the type, phone carrier, age and/or registration of each of the plurality of phone numbers.

5. The method according to claim 4 wherein at least one of the plurality of phone numbers is a landline.

6. The method according to claim 1 further comprising connecting from the digital content delivery engine over a network to the CRM database to receive the profile for the customer at the digital content delivery engine.

7. The method according to claim 1 wherein the data capable communication device is a mobile phone.

8. The method according to claim 1 wherein the digital communication is an invitation to participate in a mobile marketing campaign.

9. The method according to claim 8 wherein the mobile marketing campaign is based on the location of the registration of the at least on phone number.

10. A system for qualifying and transmitting an invitation to a mobile phone number to participate in a mobile marketing campaign, the system comprising:
   a CRM database comprising a plurality of existing customer profiles, each of the plurality of existing customer profiles comprising a customer name, an opt-in decision of the customer, and at least one phone number for the customer; and
   a digital content delivery engine, the digital content delivery engine in communication with the CRM database, the digital content delivery engine configured to receive the plurality of existing customer profiles, analyze a existing customer profile of the plurality of existing customer profiles, determine if the existing customer profile has opted-in for digital communications, receive a mobile phone carrier and type and an age and location of registration for the at least one phone number of the customer, screening the at least one phone number for association with a data capable communication device, determine that the at least one phone number of the customer is associated with a data capable communication device by sending a request for information from the digital content delivery engine to the mobile phone carrier and receiving the information from the mobile phone carrier at the digital content delivery engine, and transmit to the data capable communication device a communication comprising a digital communication.

11. The system according to claim 10 further comprising at least one network, the digital content delivery engine in communication with the CRM database over the at least one network.

12. The system according to claim 10 further comprising a server for a mobile service provider or a mobile service aggregator, the digital content delivery engine in communication with the server for the mobile service provider or a mobile service aggregator over the at least one network.

13. The system according to claim 10 wherein the data capable communication device is a mobile phone and the system further comprises a mobile phone communication network and a mobile phone for the customer, the digital content delivery engine in communication with the mobile phone over the mobile phone communication network.

14. The system according to claim 10 wherein the digital communication is a SMS communication.

15. The system according to claim 10 wherein the digital communication is a MMS communication.

16. The system according to claim 10 wherein the profile for the customer comprises a plurality of phone numbers and the method further comprises receiving a mobile phone carrier and type, and a date and location of registration for each of the plurality of phone numbers, and determining a phone number to transmit a digital communication to based on the age of each of the plurality of phone numbers.

17. The system according to claim 10 wherein the digital communication is an invitation to participate in a mobile marketing campaign.

18. A method for qualifying and transmitting an invitation to a mobile phone number to participate in a mobile marketing campaign, the method comprising:
   analyzing existing profile for a customer, the existing profile stored at a CRM database, the existing profile comprising a customer name, an opt-in decision of the customer, and a plurality of phone numbers for the customer;
   determining that the customer has opted-in for digital communications;
   receiving a phone carrier and type, and an age and location of registration of each of the plurality of phone numbers for the customer;
   screening each of the plurality of phone numbers for the customer for association with a data capable communication device by sending a request for information from the digital content delivery engine to a data capable phone carrier and receiving the information from the data capable phone carrier at the digital content delivery engine;
   determining that at least one phone number of the plurality of phone numbers for the customer is associated with a data capable communication device; and
   transmitting from the digital content delivery engine to the data capable communication device associated with the at least one phone number a communication comprising a digital communication to be processed by the data capable communication device.

19. The method according to claim 18 wherein the digital communication is an invitation to participate in a mobile marketing campaign.

20. The method according to claim 18 wherein the data capable communication device is a mobile phone.

* * * * *